United States Patent [19]

Boehme

[11] 4,175,585

[45] Nov. 27, 1979

[54] PRESSURE REGULATOR WITH MINIMUM DEAD VOLUME

[75] Inventor: Detlef R. Boehme, Walnut Creek, Calif.

[73] Assignee: Varian Associates, Inc., Palo Alto, Calif.

[21] Appl. No.: 889,599

[22] Filed: Mar. 17, 1978

Related U.S. Application Data

[63] Continuation of Ser. No. 772,785, Feb. 28, 1977, abandoned.

[51] Int. Cl.² ............................................. F16K 31/12
[52] U.S. Cl. .................................. 137/509; 137/508
[58] Field of Search ...................... 137/508, 509, 510

[56] References Cited

U.S. PATENT DOCUMENTS

| 2,248,354 | 7/1941 | Jaworowski | 137/509 X |
| 2,493,906 | 1/1950 | Wishart | 137/509 X |
| 3,389,796 | 6/1968 | Fiala | 137/509 X |
| 3,754,567 | 8/1973 | Whitten | 137/509 |

FOREIGN PATENT DOCUMENTS

| 1334478 | 7/1963 | France | 137/509 |
| 843,199 | 8/1960 | United Kingdom | 137/509 |

*Primary Examiner*—Harold W. Weakley

*Attorney, Agent, or Firm*—Stanley Z. Cole; Gerald M. Fisher

[57] ABSTRACT

A pressure regulating valve for use in a high-pressure fluid flow line, comprises a cylindrical needle-housing structure that is slidable within a bore in a valve body. An external spring urges the needle-housing structure toward a valve seat at a selectable pressure. Contact between the needle-housing structure and the valve seat is prevented by an annular protrusion in the bore. Conduit means through the valve body, connectable to the flow line, permits passage of the flow-line fluid into the needle-housing structure. A cylindrical needle is disposed coaxially within the needle-housing structure, and is urged toward the valve seat by a spring located in the needle-housing structure. When the pressure of the flow-line fluid entering the needle-housing structure exceeds the selected pressure urging the needle-housing structure toward the valve seat, the needle-housing structure assumes a position at which the needle remains spaced apart from the valve seat. However, when the pressure of the flow-line fluid falls below the selected pressure, the needle-housing structure is thereby moved to a position at which the needle is urged into contact with the valve seat. Substantially the entire interior volume of the needle-housing structure is directly in the path of the flow-line fluid, so that no "dead volumes" or pockets of fluid can accumulate therein.

2 Claims, 1 Drawing Figure

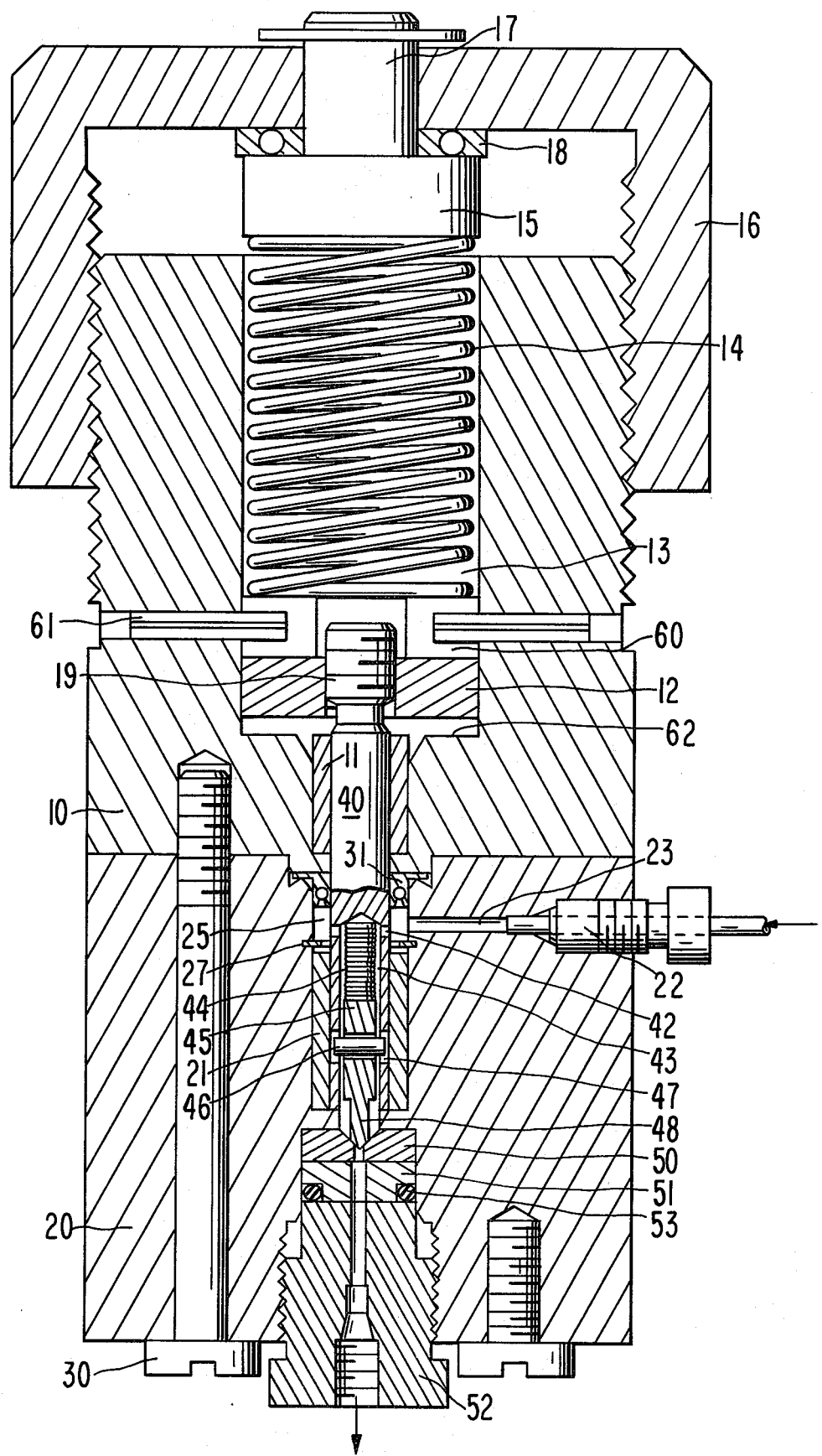

PRESSURE REGULATOR WITH MINIMUM DEAD VOLUME

This is a continuation of application Ser. No. 772,785 filed Feb. 28, 1977 and now abandoned.

BACKGROUND OF THE INVENTION

Pressure regulating valves that use a mechanical spring to urge a needle into a "seated" (i.e., closed) position are well-known in the prior art. With such valves, the needle remains in the "seated" position until the flow-line pressure exceeds a predetermined value. When the flow-line pressure exceeds the predetermined value, the needle is lifted from the valve seat, thereby opening the valve to the flow of fluid therethrough.

With pressure regulating valves commercially available at the present time, there are many "dead volumes" within the valve structure wherein flow-line fluid can become trapped. In applications such as high-pressure liquid chromatography, the existence of such trapped volumes within a pressure regulator has been found to have unacceptably deleterious consequences. Such "dead volumes", being off the direct fluid flow path through the valve structure, cannot be continuously flushed by the flowing fluid, and consequently permit the accumulation of flow-line material within the valve structure.

SUMMARY OF THE INVENTION

It is an object of this invention to provide a pressure regulating valve that is self-adjustable in response to pressure variations in a high-pressure fluid flow line, so as to maintain a constant upstream flow-line pressure without affecting the flow rate downstream of the valve.

It is a particular object of this invention to provide a valve for regulating the pressure in a high-pressure fluid flow line without affecting flow rate through the valve, where the pressure regulating mechanism of the valve is rapidly responsive to pressure variations in the flow line.

A more particular object of this invention is to provide a pressure regulating valve for use in a high-pressure fluid flow line, where pressure equilibrium between the flow-line pressure and a selectable pressure caused by a mechanical spring urges a valve-closing member to an equilibrium position corresponding to a study-state flow in the high-pressure flow line.

A particular object of this invention is to provide a valve for regulating the high-pressure upstream flow of a fluid into a conduit such as a chromatographic column, so as to prevent fluid flow into the conduit when the pressure of the fluid decreases below a predetermined value.

Another particular object of this invention is to provide a valve for regulating the upstream pressure in a flow line so as to interrupt the fluid flow whenever the pressure of the fluid exceeds a predetermined value.

A further particular object of this invention is to provide a pressure regulating valve for use in a high-pressure fluid flow line, where the pressure regulating mechanism comprises an adjustable spring-driven means for urging a needle structure into a "seated" (i.e., closed) position in the flow line, and where the flow line pressure urges the needle structure away from the "seated" position, such that during study-state flow in the flow line an equilibrium position for the needle structure can be maintained. For study-state flow, the equilibrium position assumed by the needle structure provides a valve orifice of a particular size. A change in the flow rate through the flow line cause corresponding movement of the needle structure, thereby adjusting the size of the valve orifice in order to provide a constant pressure in the fluid flow.

In the particular pressure regulating valve of this invention, the needle structure, which makes contact with the valve seat structure for closing the valve when the flow line pressure drops too low, is housed within a needle-housing structure. An external spring urges the needle-housing structure toward the valve seat structure at a selectable pressure. However, contact between the needle-housing structure and the valve seat member is prevented by a portion of the valve body within which the valve seat member is disposed. Conduit means through the valve body are connectable to the flow line to permit passage of the flow-line fluid through the needle-housing structure. The needle structure is urged toward the valve seat structure by a spring located within the needle-housing structure. When the pressure of the flow-line fluid in the interior of the needle-housing structure exceeds the selected pressure at which the external spring urges the needle-housing structure toward the valve seat structure, an equilibrium between the flow-line pressure and the selected external spring pressure is reached, which results in the needle-housing structure assuming a position at which the needle structure is spaced apart from the valve seat structure. For this position of the needle structure, the valve is "open". The extent to which the needle structure is spaced apart from the valve seat structure determines the size of the valve orifice, and thus provides a throttling effect on the passage of flow-line fluid through the valve in response to pressure variations in the flow line.

It is a feature of the pressure regulating valve of this invention that the pressure applied to the needle-housing structure by the external spring is not transmitted directly to the valve seat structure. When the flow-line pressure drops to a valve requiring that the valve be closed, the pressure provided by the internal spring to urge the needle structure into contact with the valve seat structure is just sufficient to provide a liquid-tight seal between the valve seat structure and the tip of the needle structure. The pressure provided by this internal spring is factory-determined, and is not affected by the pressure selected for the external spring.

In the particular pressure regulating valve of this invention, there are no "trapped" or "dead" volumes. The entire flow path through the valve, including that portion of the flow path through the needle-housing structure, is completely flushable by the flowing fluid.

DESCRIPTION OF THE DRAWING

The drawing accompanying this application comprises a single FIGURE, which illustrates in cross-section a valve according to the present invention.

DESCRIPTION OF THE PREFERRED EMBODIMENT

A pressure regulating valve according to this invention is illustrated in cross-section in the drawing. The valve comprises a generally cylindrical upper body 10 and a generally cylindrical lower body 20, which are coaxially disposed with respect to each other and secured in tandum by appropriate securing means such as bolts 30. Near the interface between the upper body 10 and the lower body 20, an axial core of the upper body 10 is lined with a cylindrical bushing 11 and an axial core of the lower body 20 is lined with a cylindrical bushing 21. The bushing 21 is held in place by an internal retaining ring 27, which prevents movement of the bushing when the needle-housing structure 40 moves. The inner diameters of the bushings 11 and 21 are substantially equal.

A hollow cylindrical needle-housing structure 40 is slidingly received within the bushings 11 and 21. The upper end of the needle-housing structure 40 is in contact with a lower spring-support structure 12 that is received within a cylindrical central cavity 13 of the upper body 10. A helical spring 14 bears upon the lower spring support structure 12, which has a central bore in which a set screw 19 is located. A transverse groove 60 is provided in the top of the lower spring support structure 12 to accommodate transversely oriented pins 61 that are mounted in the walls of the upper body 10. The function of the set screw 19 and the pins 61 will be discussed hereinafter.

In the preferred configuration, the axis of the spring 14 is coincident with the axis of the upper body 10. An upper spring support 15 bears upon the upper end of the spring 14. The spring 14, as well as its end support structures 12 and 15, are housed within the chamber 13. The extent to which the spring 14 is compressed (which is directly proportional to the pressure that the spring 14 can exert on the lower spring supporting structure 12) can be selected by turning a cap structure 16, which is threadably received over the open end of the upper body 10. A central contact member 17 affixed to the cap structure 16 bears upon the upper spring supporting structure 15 so as to cause compression of the spring 14. An annular thrust bearing member 18 is provided between the upper spring support structure 15 and the cap 16 in order to reduce friction when the cap 16 is twisted so as to provide a selected pressure against the needle housing structure 40.

An annular seal 31, which is preferably a spring-loaded Teflon seal, is located between the upper body 10 and the lower body 20 and surrounds the needle-housing structure 40. An inlet 22 in the lower body 20 is connectable to the flow line, whereby flow-line fluid can pass via a conduit 23 through the lower body 20 into a cylindrical central cavity or annular space 25 thereof. The flowing fluid then passes from the cavity 25 via an inlet (or inlets) 42 in the wall of the needle-housing structure 40 into the hollow interior volume 43 thereof.

A helical spring 44 is located in the interior volume 43 of the needle-housing structure 40. The upper end of the spring 44 bears against the interior portion of the needle-housing structure 40 that defines the upper wall of the interior volume 43. The lower end of the spring 44 bears against a cylindrical body 45 that is slidingly disposed within the interior volume 43. The limits of sliding motion for the cylindrical body 45 are determined by a pin 46 that is secured thereto, and by oversized holes 47 in the walls of the needle-housing structure 40 which receive the outer extremities of the pin 46.

At the lower end of the cylindrical structure 45, a needle 48 is secured. The axis of the needle 48 is substantially coincident with the axis of the needle-housing structure 40. The lower end of the needle-housing structure 40 is open so that flow-line fluid entering therein through the entrance port 42 can pass through the interior volume 43 along longitudinal flats on the cylindrical body 45, and then pass out thereof into that region of the central cavity 25 immediately above a valve seat structure 50.

The distal end of the needle 48 extends beyond the end of the needle-housing structure 40 and is configured to be receivable within the valve seat structure 50, which is fixedly disposed within the lower body 20. The valve seat structure 50 is an annular structure, the central core of which provides a flow path for the fluid leaving the central cavity 25. When the distal end of the needle 48 is "seated" in the valve seat structure 50, the valve is closed and flow of the flow-line fluid through the valve is stopped.

The valve seat structure 50 is held in place by a backup ring 51, which is secured within the lower body 20 by a nut 52 that is threadably received into the bottom portion of the lower body 20. The fluid passage way through the central core of the valve seat structure 50 is continued through central cores of the backup ring 51 and the securing nut 52. The downstream portion of the fluid flow line is connectable to the central core of the nut 52 to provide a continuous flow path through the valve when the needle 48 is separated from the valve seat structure 50. A fluid-tight seal between the backup ring 51, the securing nut 52 and the lower body 20 is provided by an O-ring 53.

Flow-line fluid entering the valve through the inlet port 22 flows downward within the interior volume 43 of the needle-housing structure 42 until it reaches the valve seat structure 50. The needle 48 is "seated" on the valve seat structure 50 when the pressure exerted by the spring 14 is not countered by any flow-line pressure. However, when the flow-line pressure is sufficient to exert an upward force on the needle-housing structure 40 is greater than the downward force exerted thereon by the spring 14, the needle-housing structure 40 rises in the direction opposite to the downward force exerted by the spring 14.

For any given pressure on the spring 14, as selectable by turning the cap structure 10, the needle 48 assumes a corresponding equilibrium position at which the spacing of the needles 48 from the valve seat structure 50 is appropriate to permit passage of the precise amount of flow-line fluid that is necessary for maintaining a constant backpressure.

In the valve of the present invention, the force exerted by the external spring 14 is not applied directly to the valve seat 50. Instead, the force exerted by the external spring 14 urges the needle-housing structure 40 downward until the spring support structure 12 is stopped by a shoulder 62. The force exerted by the spring 44 is just sufficient to provide a liquid seal between the distal tip of the needle 48 and the valve seat member 24.

In a situation where the flow resistance of the flow line results in a backpressure that is greater than the pressure setting of the cap structure 16, the valve will go into a wide-open mode. At that point, the needle housing structure 40 pushes on the set screw 19 in the spring support structure 12. The movement of the spring support structure 12 is then stopped by the pins 61.

The flow regulator valve disclosed herein permits continuous purging of the valve, because dead volumes in which flow-line material might accumulate are eliminated. Furthermore, all the internal volumes within the valve are minimized, thereby providing maximum flushing of the internal surfaces of the valve. This greatly reduces the likelihood of contamination, which is especially desirable in chromatographic applications.

The principal of this invention having been disclosed herein and having been illustrated by a particular embodiment, it is noted that alternative structural details embodying the principal of this invention are possible, which would be within the scope of this invention. Therefore, the scope of this invention is limited only by the following claims.

What is claimed is:

1. A pressure regulating valve for use in a high-pressure liquid chromatography fluid flow line, said valve comprising:

a housing, a cylindrical slidable piston structure having an axial bore therein such that said piston structure has a partially hollow interior volume having a bore opening, cylindrical walls and a bore bottom, said cylindrical walls surrounding said hollow interior volume having a radial port therethrough immediately adjacent said bore bottom, said piston structure fitted in said housing and slidable in respect thereto, a valve seat structure disposed externally of said piston structure, said valve seat structure including a valve seat, means for urging said piston structure toward said valve seat structure at a selectable pressure, means for preventing contact of said piston structure with said valve seat, a cylindrical needle structure disposed within said piston structure, and spring biasing means disposed entirely within said bore of said piston structure for urging said needle structure toward said valve seat structure, said piston structure being configured so that the flow line fluid in the interior volume of said piston structure urges said piston structure away from said valve seat structure when the pressure of said flow line fluid is greater than the selected pressure at which said piston structure is urged toward said valve seat structure, thereby establishing an equilibrium between said flow line pressure and said selected pressure, said needle structure moving toward contact with said valve seat structure when the pressure in said flow line is slightly less than said selected pressure, thereby tending to close said valve, conduit means connectable to said flow line, said conduit means terminating in an annular space formed in said housing substantially surrounding said piston structure immediately adjacent said port, said annular space having a larger dimension than said port in the direction in which said housing is slidable, said bore containing said spring bias means and said needle structure and whereby the entire bore is directly in a non-branching flow path between said flow line and said valve seat so that there are minimum trapped fluid areas and rapid purging of said bore is attainable.

2. The pressure regulating valve of claim 1 wherein said piston structure is slidably disposed within a sleeve structure, said sleeve structure being fixedly disposed within said housing, said valve seat structure being fixedly disposed within said housing structure, a portion of said housing structure serving as said means for preventing contact of said piston structure with said valve seat.

* * * * *

UNITED STATES PATENT AND TRADEMARK OFFICE
CERTIFICATE OF CORRECTION

PATENT NO. : 4,175,585
DATED : November 27, 1979
INVENTOR(S) : Detlef R. Boehme

It is certified that error appears in the above-identified patent and that said Letters Patent are hereby corrected as shown below:

Column 2, line 42, change (first occurrence) "valve" to --value--;
Column 3, line 32, change "open" to --upper--.

Signed and Sealed this

Twenty-eighth Day of July 1981

[SEAL]

Attest:

GERALD J. MOSSINGHOFF

Attesting Officer

Commissioner of Patents and Trademarks